(12) United States Patent
Lundberg

(10) Patent No.: US 6,951,337 B2
(45) Date of Patent: Oct. 4, 2005

(54) SHAFT SEAL WITH ELASTIC SEALING LIP

(75) Inventor: Jörgen T Lundberg, Östersund (SE)

(73) Assignee: Metso Paper, Inc. (FI)

( * ) Notice: Subject to any disclaimer, the term of this patent is extended or adjusted under 35 U.S.C. 154(b) by 0 days.

(21) Appl. No.: 10/469,845

(22) PCT Filed: Mar. 4, 2002

(86) PCT No.: PCT/SE02/00368
§ 371 (c)(1),
(2), (4) Date: Sep. 4, 2003

(87) PCT Pub. No.: WO02/070929

PCT Pub. Date: Sep. 12, 2002

(65) Prior Publication Data
US 2004/0084853 A1 May 6, 2004

(30) Foreign Application Priority Data
Mar. 7, 2001 (SE) .............................. 0100772

(51) Int. Cl.$^7$ ............................... F16J 15/32
(52) U.S. Cl. ..................... 277/553; 277/349; 277/351; 277/549
(58) Field of Search ............................ 277/349, 351, 277/549, 55

(56) References Cited

U.S. PATENT DOCUMENTS

| 3,401,947 | A |  | 9/1968 | Rumsey |  |
|---|---|---|---|---|---|
| 3,658,395 | A |  | 4/1972 | Hallerback |  |
| 3,703,296 | A | * | 11/1972 | Malmstrom | 277/402 |
| 4,311,316 | A |  | 1/1982 | Cather, Jr. |  |
| 4,432,557 | A | * | 2/1984 | Drucktenhengst | 277/351 |
| 4,544,164 | A |  | 10/1985 | Cuijpers |  |
| 4,544,286 | A | * | 10/1985 | Basener | 384/486 |
| 4,848,776 | A | * | 7/1989 | Winckler | 277/349 |
| 4,866,827 | A |  | 9/1989 | Benfer et al. |  |
| 4,984,812 | A |  | 1/1991 | Wada et al. |  |
| 6,264,205 | B1 |  | 7/2001 | Balsells |  |
| 6,663,110 | B2 | * | 12/2003 | Platner | 277/563 |

FOREIGN PATENT DOCUMENTS

EP          0 942 209 A2     9/1999

* cited by examiner

Primary Examiner—Enoch Peavey
(74) Attorney, Agent, or Firm—Lerner, David, Littenberg, Krumholz & Mentlik, LLP

(57) ABSTRACT

A V-ring seal is disclosed for sealing between relatively rotatable surfaces in which the V-ring seal comprises PTFE and includes a body with an inner side for abutting against a first surface and a lip extending from the body towards a second surface, the lip including a rear side distal from the second surface, a front side proximate to the second surface, a lower portion proximate to the body, an upper portion distal from the body, a sealing surface on the front side of the lip for abutting the second surface to seal the second surface, and a resilient ring for providing a force acting on the lip to urge the sealing surface towards the second surface, the resilient ring being disposed on the front side of the lower portion of the lip whereby the resilient ring is concealed from the rear side of the lip.

4 Claims, 1 Drawing Sheet

SHAFT SEAL WITH ELASTIC SEALING LIP

FIELD OF THE INVENTION

Figure 1:
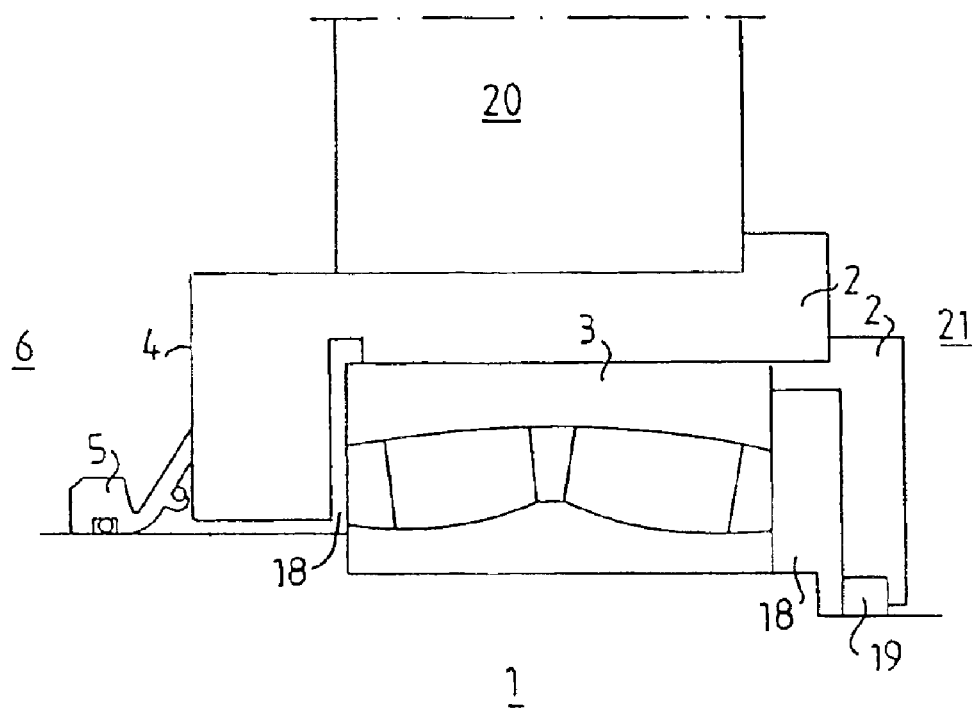

The present invention relates to a sealing of the type V-ring.

A V-ring can be used for sealing at a cylindric rotary cylindrical body. This cylindric body can be, for example, a shaft for a roll in a dewatering means for dewatering material suspensions. Such a dewatering means can comprise two co-acting cylindric rotary rolls, at least one of which is liquid permeable. The rolls form a nip between them, through which the material suspension is intended to pass, while simultaneously being dewatered. The material suspension usually passes through the nip upward from below.

The material suspension can be, for example, a pulp suspension, and the dewatering means can thus be a washing press or a dewatering press.

Dewatering means known in the art will be described below in which both rolls are liquid permeable. The rolls are formed with liquid permeable shell surfaces, which consist of a perforated metal sheet attached on a roll body.

The rolls are rotary on two parallel shafts. The material suspension is supplied to the means so that, by rotation of the rolls, it is moved upward from below through the nip, where compression and dewatering of the material to the desired dry matter content takes place.

After passing through the nip, the material is picked-up from the rolls by means of a doctor blade device. The material is then transported away from the dewatering means.

The liquid (filtrate) passing through the shell surface is conducted away through channels inside the shell surface to the ends of the rolls and further away from the dewatering means.

The roll arrangement, of course, can also be formed so that the material suspension, by rotation of the rolls, is moved through the nip downward from above.

Means of the type referred to above are described, for example, in Swedish Patent No. 501,710 and International Application No. WO 98/54401.

Each shaft is mounted in bearings, and the bearings are located in a bearing housing, which is filled with oil. In order to seal at the shaft between the oil-filled space of the bearing housing and the space holding the filtrate, a seal of the rubber V-ring type is located in such a manner that it rotates with the shaft and has a lip resting against the wall of the bearing housing.

It is very important that no filtrate can penetrate into the bearing, which would be subject to great damage, and in the worst case breaks down.

In connection with such means there is the problem that the V-ring is destroyed and requires frequent exchange. This causes very expensive shutdowns.

One object of the present invention is to provide a seal with a considerably longer service life than seals of the V-ring type according to art.

The service life of the rubber is shortened both by high temperature and low pH. The combination of low pH and high temperature is highly destructive. In a dewatering means of the type described above, the filtrate has a low ph and a high temperature. In the extreme case the temperature can be about 90° C. and the pH about 2.

SUMMARY OF THE INVENTION

This and other objects have now ben realized by the discovery of apparatus for creating a seal between a first surface and a second surface, the first surface being rotatable with respect to the second surface, the apparatus comprising PTFE and including a body having an inner side of abutting the first surface and a lip extending from the body towards the second surface, the lip including a rear side distal from the second surface, a front side proximate to the second surface, a lower portion proximate to the body, an upper portion distal form the body, a sealing surface on the front side of the lip for abutting the second surface to seal the second surface, and a resilient ring element for providing a force acting on the lip to urge the sealing surface towards the second surface, the resilient ring element being disposed on the front side of the lower portion of the lip whereby the resilient ring element is concealed from the rear side of the lip. Preferably, the first surface comprises a rotary shaft.

In accordance with one embodiment of the apparatus of the present invention, the ppratus includes a holding member on the front side of the lip for locating the resilient ring element.

In accordance with another embodiment of the apparatus of the present invention, the resilient ring element comprises a ring-shaped helical spring.

The seal according to the present invention is of the V-ring type, and is formed of PTFE, which is advantageously reinforced, for example, with carbon. PTFE withstands the acid environment, but is not as elastic as rubber. In order to render the seal elastic a spring is located on the seal in such a manner that the spring does not come into contact with the filtrate, because it should not be exposed to the aggressive environment of the filtrate. Furthermore, fibers in the filtrate easily adhere to the spring and can be thereby deteriorate its functioning.

The spring is arranged so that it causes the lip of the seal to be pressed against the surface, against which it is intended to seal, in this case the wall of the bearing housing.

BRIEF DESCRIPTION OF THE INVENTION

Figure 2:
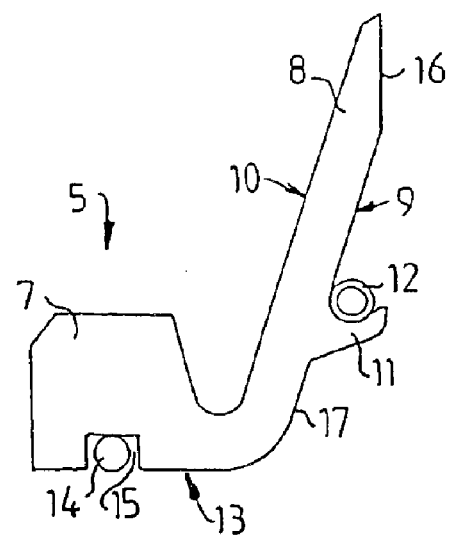

A preferred embodiment of the seals of the present invention is described in the following detailed description, with reference to the accompanying drawing, in which:

FIG. 1 is a side, elevational, partial, enlarged view of a shaft portion in a dewatering means in accordance with the present invention, and FIG. 2 is a side, elevational, enlarged view of a seal in accordance with the present invention.

DETAILED DESCRIPTION

The dewatering means, as such, will not be described in detail, because it is already well known, such as through the specifications referred to above.

FIG. 1 shows a portion of a shaft in a dewatering means of the type described above. Only the upper half of a shaft 1 is shown, because the means is substantially symmetric.

In a bearing housing 2 on the shaft 1 a bearing 3 is located. The bearing housing 2 is located in a hole in a wall 20, which separates a medium space 6 from the outside of the dewatering means, i.e. the atmosphere 21.

The medium space 6 contains the filtrate, which by means of the dewatering means was pressed out of a pulp suspension. The filtrate contains also a certain amount of fibers, which at the dewatering followed along with the filtrate.

The bearing housing, together with the shaft, encases a bearing space 18, in which the bearing 3 is located. The bearing space 18 suitably is filled with oil, but can also, for example, be filled with fat or air. A radial seal 19 from a seal between the bearing space 18 and atmosphere 21. The bearing housing 2, against the medium space 6 for the filtrate has, a bearing housing wall 4, against which a seal 5 of the type V-ring acts in order to seal between the bearing space 18 and medium space 6.

The V-ring 5 in FIG. 2 comprises a body 7 with an inner side 13, which abuts the shaft 1. The V-ring is arranged to rotate with the shaft 1 during the rotation thereof. As shown in the Figure, an O-ring 14 is located in a recess 15 in the body 7 at the inner side 13 thereof, in such a manner, that the O-ring 14 in the mounted state of the V-ring 5 on the shaft 1, is encased by the body 7 and the shaft 1. It is the function of the O-ring to ensure that neither oil nor filtrate can pass between the V-ring 5 and the shaft 1. Instead of the O-ring also other types of seals can also be used, for example a sealing liquid. The decision as to which type of seal is suitable in this position depends on the medium used, and in certain cases no seal is needed at all.

The V-ring 5 comprises a lip 8 with a rear side 10 and a front side 9, where the front side 9 is divided into an upper portion, the sealing surface 16, and a lower portion 17. The sealing surface 16 acts against the bearing housing wall 4. On the lower portion 17 a holding means 11 is located, which in this case is a shelf. On the shelf 11 a resilient ring element 12 is located, which in this case is a ring-shaped helical spring. Also other resilient elements can also be used, for example an O-ring.

The spring 12 is arranged on the shelf 11 in such a way that it acts with a pulling force on the lip 8 and thereby pulls the lip 8 against the bearing housing wall 4, so that its sealing surface 16 can abut the bearing housing wall 4.

PTFE is not elastic, but the material "floats" in the direction of the acting force. The result, however, will, at the final end, be the same as in the case of an elastic material, but with a certain delay compared with an elastic material.

During rotation of the shaft 1 the V-ring 5 follows along in the rotation, and the sealing surface 16 of the lip abuts (seals against) the non-rotating bearing housing wall 4. At the V-ring 5 the flow will then be such that the oil tends to flow past between the lip and bearing housing wall, 4. Thus, no filtrate can get into the bearing housing 2 and contact the spring 12 or the bearing 3.

The resilient ring element 12 can also be arranged in a different way, but so that it affects the lip 8 with a force, which results in that the sealing surface 16 moving in the direction to the surface it is intended to seal against, which means that it is pressed against the bearing housing wall 4.

The spring 12 also must not come, into contact with the filtrate in the medium space 6, but shall be concealed; as seen from rear side 10 of the lip 8.

The spring 12, thus, can also be located entirely enclosed within the lip 8.

It is possible to advantageously arrange more seals, suitably radial seals, between the bearing and the space containing the filtrate.

The V-ring can also advantageously be used in other means where it seals against an aggressive environment, and with still greater advantage in cases when it seals against an aggressive medium, where the medium in addition contains particles, such as fibers.

The device where the V-ring shall be used can, for example, also be formed so that the shaft, on which the V-ring is located, is intended to be non-rotating, and the surface, against which the lip is intended to act, is rotary.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing form the spirit and scope of the present invention as defined by the appended claims.

What is claimed is:

1. Apparatus for creating a seal between a first surface and a second surface, said first surface being rotatable with respect to said second surface, said apparatus comprising PTFE and including a body having an inner side for abutting said first surface and a lip extending from said body towards said second surface, said lip including a rear side distal from said second surface adapted to seal off a fluid medium, a front side proximate to said second surface, a lower portion proximate to said body, an upper portion distal from said body, a sealing surface on said front side of said lip for abutting said second surface to seal said second surface, and a resilient ring element for providing a force acting on said lip to urge said sealing surface towards said second surface, said resilient ring element being disposed on said front side of said lower portion of said lip whereby said resilient ring element is concealed from said rear side of said lip and that the resilient ring element is not exposed to the sealed off fluid medium.

2. The apparatus of claim 1 wherein said first surface comprises a rotary shaft.

3. The apparatus of claim 1 including a holding member on said front side of said lip for locating said resilient ring element.

4. The apparatus of claim 1 wherein said resilient ring element comprises a ring-shaped helical spring.

* * * * *

UNITED STATES PATENT AND TRADEMARK OFFICE
CERTIFICATE OF CORRECTION

PATENT NO. : 6,951,337 B2
DATED : October 4, 2005
INVENTOR(S) : Jörgen T. Lundberg It is certified that error appears in the above-identified patent and that said Letters Patent is hereby corrected as shown below:

Column 1,
Line 8, after "at a" delete "cylindric".
Line 9, "cylindric" should read -- cylindrical --.
Line 11, after "Such" delete "a".
Lines 16 and 27, "upward" should read -- upwardly --.
Line 24, "attached on" should read -- attached to --.
Line 29, "takes" should read -- take --.
Line 54, "breaks down" should read -- would then break down --.
Line 63, "temperature" should read -- temperatures --.
Line 65, "ph" should read -- pH --.

Column 2,
Line 7, "side of abutting" should read -- side for abutting --.
Line 21, "ppratus" should read -- apparatus --.
Line 58, "symmetric" should read -- symmetrical --.
Line 66, "filtrate contains also a" should read -- filtrate also contains a --.
Line 67, "which at the dewatering followed" should read -- which during the dewatering step followed --.

Column 3,
Line 3, "18 suitably is filled" should read -- 18 is suitably filled --.
Line 4, "from" should read -- forms --.
Line 6, "filtrate" should read -- filtrate, --.
Line 7, "has," should read -- has --.
Line 9, "and medium" should read -- and the medium --.
Line 11, "abuts the shaft" should read -- abuts against the shaft --.
Line 13, "14 is located" should read -- 14 is also located --.
Line 19, before "other types" delete "also".
Line 37, "but the material" should read -- but this material --.

UNITED STATES PATENT AND TRADEMARK OFFICE
CERTIFICATE OF CORRECTION

PATENT NO. : 6,951,337 B2
DATED : October 4, 2005
INVENTOR(S) : Jörgen T. Lundberg It is certified that error appears in the above-identified patent and that said Letters Patent is hereby corrected as shown below:

<u>Column 3 (cont'd),</u>
Line 50, after "results in" delete "that".
Line 53, "come, into" should read -- come into --.
Line 54, "concealed; as" should read -- concealed, as --.

Signed and Sealed this

Twenty-eighth Day of March, 2006

JON W. DUDAS
*Director of the United States Patent and Trademark Office*